(12) United States Patent
Kim (10) Patent No.: US 7,379,669 B2
(45) Date of Patent: May 27, 2008

(54) METHOD AND APPARATUS FOR DUPLEX COMMUNICATION IN HYBRID FIBER-RADIO SYSTEMS

(75) Inventor: A-jung Kim, Seoul (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 718 days.

(21) Appl. No.: 10/423,760

(22) Filed: Apr. 25, 2003

(65) Prior Publication Data

US 2003/0231601 A1    Dec. 18, 2003

(30) Foreign Application Priority Data

Apr. 25, 2002  (KR) ............................... 2002-22704

(51) Int. Cl.
*H04J 14/00* (2006.01)
(52) U.S. Cl. ............................. 398/74; 398/66; 398/76
(58) Field of Classification Search ............ 398/66–68, 398/72–76, 115, 121
See application file for complete search history.

(56) References Cited

U.S. PATENT DOCUMENTS 5,247,310 A * 9/1993 Waters ........................ 342/368
5,818,386 A * 10/1998 Belisle ........................ 342/372
5,838,473 A * 11/1998 Wake ........................... 398/141
5,864,672 A * 1/1999 Bodeep et al. ............... 725/126
6,496,079 B1 * 12/2002 Pleasant et al. .............. 332/103
6,674,969 B1 * 1/2004 Ogusu .......................... 398/79

FOREIGN PATENT DOCUMENTS

EP    0 845 878 A2    6/1998
EP    0 845 878 A3    6/1998

OTHER PUBLICATIONS

Noel, et al., "120 Mbit/s QPSK radio-fibre . . . ",Electronics Letters 32(20):1895-1897 (Sep. 26, 1996).

* cited by examiner

*Primary Examiner*—Dzung Tran
(74) *Attorney, Agent, or Firm*—Lee & Morse, P.C.

(57) ABSTRACT

An apparatus and method for enabling cost-effective duplex communication by diplexing one of down stream signals for frequency up-conversion in a hybrid fiber-radio system includes diplexing an unmodulated mode signal among beating signals between a master laser and an injection-locked slave laser and using the diplexed signal for down-conversion in upstream transmission, thereby eliminating the need for expensive high-frequency local oscillators for frequency conversion. Higher radio frequency signals can be generated using beating between basic modes and satellite modes such as FWM conjugates of the master laser and slave laser. Cost-effective systems, stabilization of a light source and improved transmission performance may be achieved by using a diplexer instead of an expensive high-frequency local oscillator.

7 Claims, 8 Drawing Sheets

| Recording Medium |
|---|

METHOD AND APPARATUS FOR DUPLEX COMMUNICATION IN HYBRID FIBER-RADIO SYSTEMS

BACKGROUND OF THE INVENTION

1. Field of the Invention

The present invention relates to a method and apparatus for enabling cost-effective duplex communication by diplexing one of down stream signals for frequency upconversion in a hybrid fiber-radio system.

2. Description of the Related Art

Increasing demands for new mobile internet services including video and interactive services have resulted in the exhaustion of the available frequency band for wireless communications, and so triggered the development of the 4th generation wireless communication system. As the next generation communication system of the IMT-2000 (International Mobile Telecommunication), micro/millimeter-wave communication utilizing signals in the band of 3 GHz to 300 GHz is drawing attention for broadband wireless communication.

However, because of its limitation on the transmission distance and need for high-frequency sources, the micro/millimeter-wave communication system must be hybrided with existing wire systems. Low-attenuation, EMI-free optical fiber transmission is considered the most promising candidate for long-haul transport of high frequency band wireless signals. Thanks to the development of optical amplifiers and WDM wavelength division multiplexing) technology, transmission capacity is remarkably increased with optical fiber communication systems. Employing optical fiber in transmitting and amplifying micro/millimeter-wave signals is advantageous in utilizing existing core optical fiber systems and mature technologies in more economical ways. In such hybrid systems, the technology for generating optical micro/millimeter-waves is the key technology for broadband communication systems.

A main issue in hybrid fiber-radio transmission systems is signal band conversion into a carrier frequency, because up/down conversion between baseband and carrier frequency in micro/millimeter-wave systems requires expensive equipment.

There are three system options: baseband signal transmission, intermediate frequency (IF) signal feeder transmission, and optical micro/millimeter-wave transmission. A disadvantage of baseband transmission is the necessary use of highly complex outdoor base stations including full SDH/SONET compliant equipment. A disadvantage of the IF feeder system is the use of moderately complex outdoor base stations including RF up/down conversion. For high radio frequency systems, however, both the baseband transmission and IF feeder transmission methods require many local oscillators to up/down convert signal frequencies into carrier frequencies. Therefore, neither baseband signal transmission nor IF signal feeder transmission are considered cost-effective solutions for pico-cell communication.

Among the system design options for the hybrid fiber-radio system, generating and transmitting optical micro/millimeter-wave signals has many advantages. For example, the optical micro/millimeter-wave transmission system requires relatively simple outdoor base stations with compact remote antenna units. In an optical micro/millimeter-wave transmission system, signals at carrier frequencies are optically generated with light sources at a central office (CO) and transmitted through optical fibers to a remote station (RS), where the signals are simply optical to electrical converted (O/E-converted). Therefore, using a micro/millimeter-wave transmission system can reduce loads of many RSs in pico-cell communication networks. Moreover, as the high-frequency optical signals are generated at a central station, the optical micro/millimeter-wave transmission system is not only cost-effective and efficient, but also allows a centralized system to be implemented. With control functions at the central station, channel allocation, hand-over, and antenna positioning can be easily controlled, and the number of subscribers that the system can support is increased.

In addition to the advantage of easy system maintenance, the optical micro/millimeter-wave transmission system has transparency to modulation types. Since the generated optical signals are modulated by electrical baseband signals, the optical micro/millimeter-wave transmission system is flexible to any type of modulation format. With these advantages, the optical micro/millimeter-wave transmission system enables cost-effective and efficient communication and provides flexibility to radio access systems. Thus, the method of optical micro/millimeter-wave generation and transmission has been applied to mobile communications and wireless subscriber loops such as mobile LANs or broadband wireless local loops (B-WLL) or LMDS systems.

Despite its many advantages, the optical micro/millimeter-wave transmission system has problems in upstream transmission from a subscriber to a head end, because in upstream transmission, it is necessary to generate an optical micro/millimeter-wave in a remote base station, which may increase the cost of RSs. Therefore, it is difficult to apply the optical micro/millimeter-wave transmission system to duplex communication systems.

SUMMARY OF THE INVENTION

To solve the above-described problems, it is a feature of an embodiment of the present invention to provide an apparatus and method for enabling duplex communication by generating and diplexing optical micro/millimeter signals in a hybrid fiber-radio system. In particular, it is a feature of an embodiment of the present invention to provide an efficient method for enabling duplex communication by generating signals in a carrier frequency mode and in side-band modes. One of the generated modes is diplexed with a diplexer, and is used for down-conversion in upstream transmission, thereby eliminating the need for expensive high-frequency local oscillators for frequency conversion.

In an effort to achieve the feature described above, in one embodiment of the present invention there is provided an apparatus for duplex communication in a hybrid fiber-radio system, the apparatus at a central office including a central station including an electrical signal source unit for generating electrical RF signals; a master laser (ML) driven by the electrical RF signals for generating optical signals; a local oscillator for generating intermediate frequency signals; a modulator for converting user binary data into modulated data signals; a mixer for mixing the intermediate frequency signals and the modulated data signals; a slave laser (SL) for outputting the optical signals at a lasing frequency and the modulated data signals at a down-converted frequency; an optical routing device for feeding signals from the ML to the slave laser 16 and for launching signals from the slave laser 16 over an optical transmission fiber; and a photodetector for receiving an optical signal from an upstream link.

In another embodiment, there is provided an apparatus for duplex communication in a hybrid fiber-radio system, the apparatus at a remote station including an optical-to-electrical (O/E) converter for converting received optical signals into electrical signals; a diplexer for splitting modulated data mode signals containing user source data and unmodulated non-data mode signals; a radio transmitter for converting the data mode signals into wireless radio transmission signals and transmitting the radio transmission signals wirelessly; a radio receiver for converting received wireless radio transmission signals into electrical signals; a mixer for mixing the unmodulated non-data mode signals from the diplexer and the electrical signals from the radio receiver; and an optical transmitter for generating optical signals modulated by the mixed electrical signals.

BRIEF DESCRIPTION OF THE DRAWINGS

The above features and advantages of the present invention will become more apparent to those of ordinary skill in the art by describing in detail preferred embodiments thereof with reference to the attached drawings in which.

DETAILED DESCRIPTION OF THE INVENTION

Korean Patent Application No. 2002-22704, filed on Apr. 25, 2002, and entitled: "Method And Apparatus For Duplex Communication In Hybrid Fiber-Radio System" is incorporated by reference herein in its entirety.

The present invention will now be described more fully with reference to the accompanying drawings, in which preferred embodiments of the invention are shown.

Figure 1:
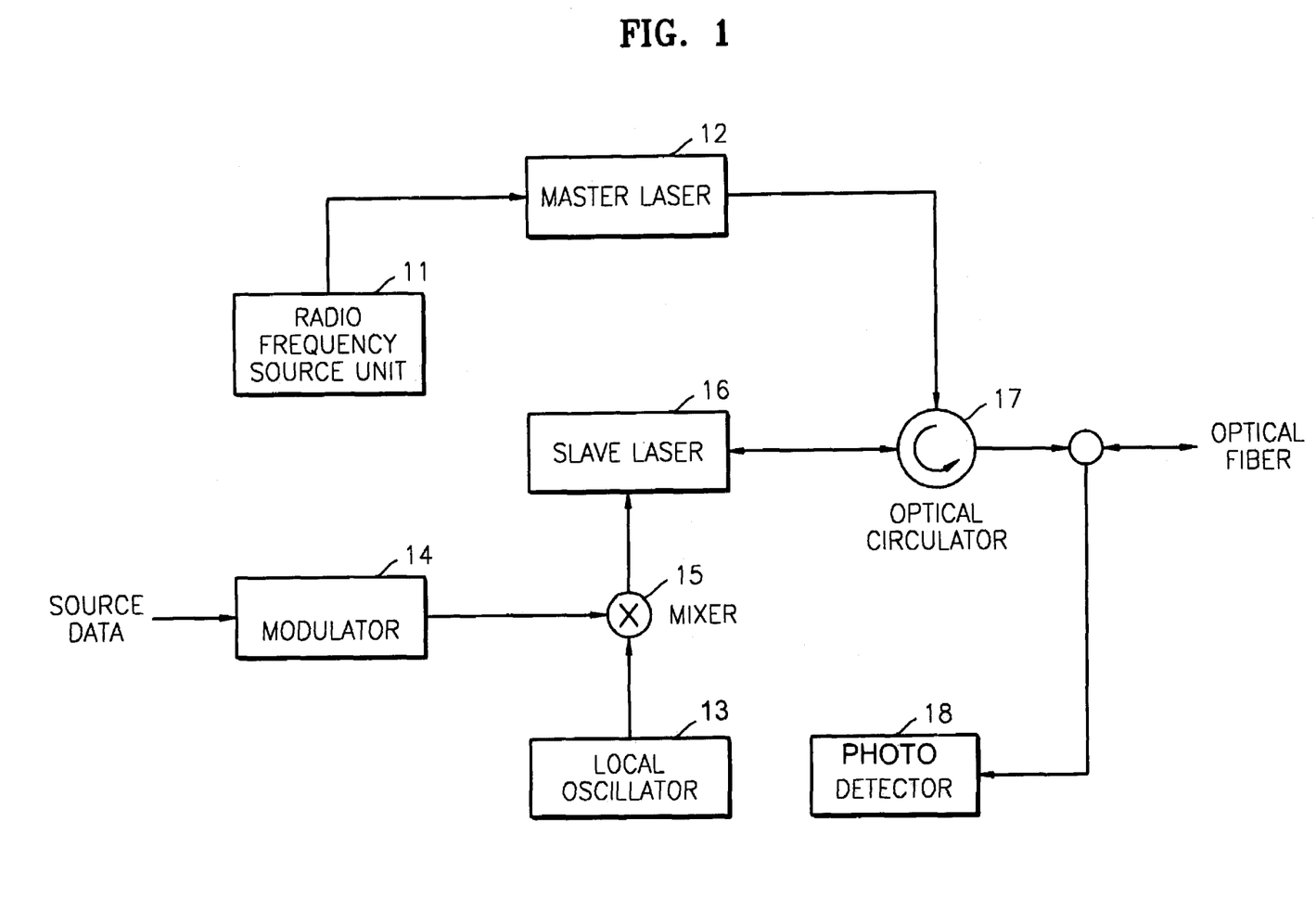
FIG. 1 illustrates a configuration of a central station according to an embodiment of the present invention.

FIG. 1 illustrates a configuration of a central station in a hybrid fiber-radio system for duplex communication. The central station includes a master laser 12 and a slave laser 16. A radio frequency source unit 11 generates electrical signals at a radio frequency and is connected to the master laser 12. The radio frequency source unit 11 drives the master laser 12 using a direct modulation method. An optical signal output from the master laser 12 is injected into the slave laser 16 by the routing operation of an optical circulator 17, and mode locks the slave laser 16. A modulated data signal from a modulator 14 and a signal from a local oscillator (LO) 13 are mixed by a mixer 15, which outputs a mixed signal. For example, quadrature phase shift keying (QPSK) may be employed as a typical modulation method for wireless systems, but other modulation formats are acceptable for the implementation of the present invention. QPSK is a digital frequency modulating technique in which two bit data of 0 and 1 of digital signals are modulated as one of four phases of a carrier frequency wave.

The mixed signal is further applied to the slave laser 16 to modulate the slave laser and then modulated signals are generated at a frequency translated from a lasing frequency of the slave laser 16, $f_{SL}$ by the frequency of the local oscillator 13, $f_{LO}$. The output from the slave laser 16 is composed of a non-data mode signal injection-locked by the master laser 12, and data mode signals modulated and band-shifted by the modulator 14 and the local oscillator 13. The output signals are then transmitted through an optical fiber by the routing operation of the optical circulator 17. Instead of the optical circulator 17, a coupler having an isolator may be used as a device for applying an optical signal from the master laser 12 to the slave laser 16. The slave laser 16 for the above operation may be either a Fabry Perot Laser Diode (FP-LD) or a Distributed Feed Back Laser Diode (DFB-LD) without an internal isolator so that an external optical signal can be injected thereto. A cost-effective FP-LD is used when only digital signals are forwarded, while a DFB-LD may be used for the purpose of transmitting analog broadcasting signals such as in video broadcasts.

For uplink transmission, the central station includes a photodetector 18, which receives signals from a RS.

Figure 2:
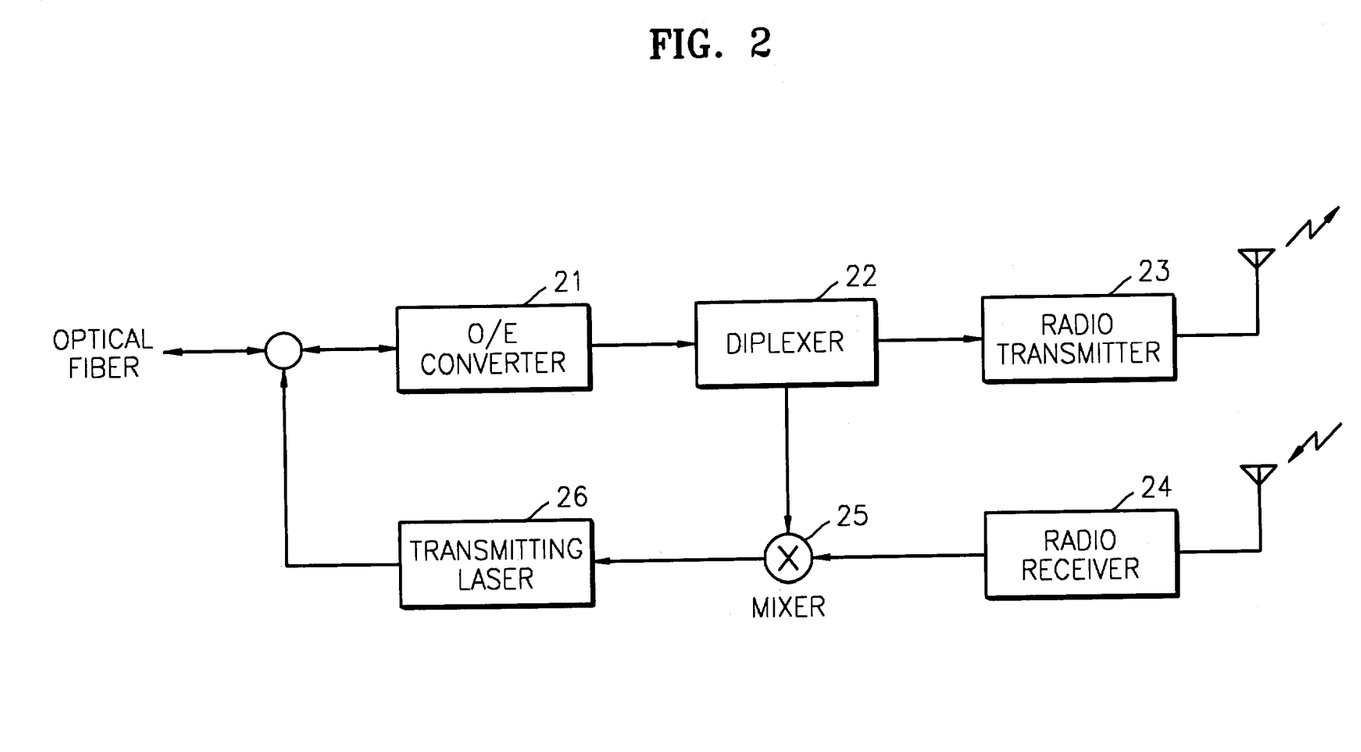
FIG. 2 illustrates a remote base station according to an embodiment of the present invention.

FIG. 2 illustrates a remote base station in a hybrid fiber-radio system for duplex communication according to an embodiment of the present invention. The optical signals output from the slave laser 16 are transmitted over the optical fiber and are received by the remote base station. Then, each optical signal is converted into an electrical signal by an optical-to-electrical (O/E) converter 21, and then demultiplexed by a diplexer 22 into an unmodulated non-data mode signal and a modulated data mode signal containing user source data. The modulated data mode signals are transmitted to a radio transmitter 23. The radio transmitter 23 including an antenna converts the modulated data mode signals, which are electrical, into wireless radio signals and broadcasts them. The unmodulated non-data mode signal, which is band-shifted, is diverted and used as a local oscillator for upstream transmission.

In uplink communication, a radio receiver 24 converts signals received through the antenna into electrical signals. A mixer 25 mixes the electrical received signal and the unmodulated non-data mode signal output from the diplexer 22. The unmodulated non-data mode signal is used as a local oscillator that shifts a carrier frequency during down conversion. The mixed intermediate frequency (IF) signal is supplied to an optical transmitter 26, a laser which generates an optical signal, which is then transmitted through the optical fiber to the photodetector 18 corresponding to a receiver in the central station. A filter for uplink and downlink can be achieved using a wavelength division multiplexing (WDM) coupler.

The electrical RF signal source unit 11 driving the master laser 12 in the hybrid fiber-radio system for duplex communication is employed to generate side-band modes of the master laser 12 and to stabilize signals from the slave laser 16 by means of injection locking. The photodetector 18, which is governed by a square law, uses a direct detection method to detect a master laser signal, a slave laser signal, and four-wave mixing (FWM) signals, and also measures beat signals that are generated from beating between these signals. That is, when a continuous wave is generated by an adjustment in a bias current and operating temperature of the master laser 12 and injected into the slave laser 16, nondegenerated FWM conjugates having frequencies of a difference between lasing frequencies of the master laser 12 and the slave laser 16, i.e., $f_{ML}-f_{SL}$, and the sum of the lasing frequencies of the master laser 12 and the slave laser 16, i.e., $f_{ML}+f_{SL}$, are generated due to the non-linear characteristics of the semiconductor laser. The photon density in a cavity of the slave laser 16 oscillates with a frequency of a difference between the lasing frequencies of the master laser 12 and the slave laser 16. Beat signals between the NDFWM conjugate signals as well as peak signals of the master laser 12 and the slave laser 16 are detected. The beat signals have different sources, and thus coherency is weak. Accordingly, they have low stability or purity. In order to stabilize the beat signals and reduce phase noise, the master laser 12 is connected to the RF source unit 11 so that a signal can be directly and electrically modulated. In this operation, side bands are formed around a lasing frequency with frequency modulation (FM) in the master laser 12, and these modes are injected into the cavity of a slave laser 16. One of the side-band modes of the master laser 12 locks the lasing mode of the slave laser 16 at a peak frequency and coherency between the two sources is achieved. As a result, as well as the basic mode of the slave laser 16 and the master laser 12, satellite modes including FWM overlapping with the side bands of the master laser 12 are mode-locked as well, and so the output beat signals are stabilized, having low fluctuation and phase noise.

The present invention is based on the fact that FM side band modes generated at a laser that is directly modulated by a RF source signal are used to lock another laser to thus generate a high frequency beat signal that is an unmodulated non-data signal. The present invention is also based on the fact that a band-shifted signal that is generated by mixing an IF signal generated from a local oscillator with a modulated signal containing user source data is transmitted as a downlink signal. Finally, the present invention is based further on the fact that the unmodulated non-data signal is diplexed so that it is used as a local oscillator for down conversion of an uplink signal when an uplink signal is transmitted.

To summarize the operation of a down link signal transmission, in a central station, a master laser driven by a RF source generates an optical signal, which is injected into a slave laser 16 and locks the lasing mode of the slave laser 16, and in turn, an unmodulated optical beat signal with low phase noise is generated. A local oscillator generates an IF signal. User source data is converted into a modulated signal by a modulator. The IF signal and the modulated signal from the modulator are mixed. The mixed signal is fed to a slave laser, and the output is a data modulated signal at the lower side-band. The unmodulated mode signal and the data mode signal are transmitted over an optical fiber with the routing operation of an optical routing device. The optical signal received through the optical fiber is converted into an electrical transmission signal. A diplexer splits the electrical transmission signal into the data mode signal containing the user source data and an unmodulated mode signal. The data mode signal is converted into a radio signal and is then transmitted wirelessly.

The uplink transmission process in duplex fiber-radio communication according to an embodiment of the present invention is explained as follows. Signals that are wirelessly received by an antenna are converted into electrical signals. Diplexed unmodulated non-data mode signals are mixed with the received electrical signals and the signal band of the data is down-converted. A laser converts the electrical signals into optical signals and transmits them over an optical fiber, and a photodetector at a central office receives the optical signals.

Figure 3:
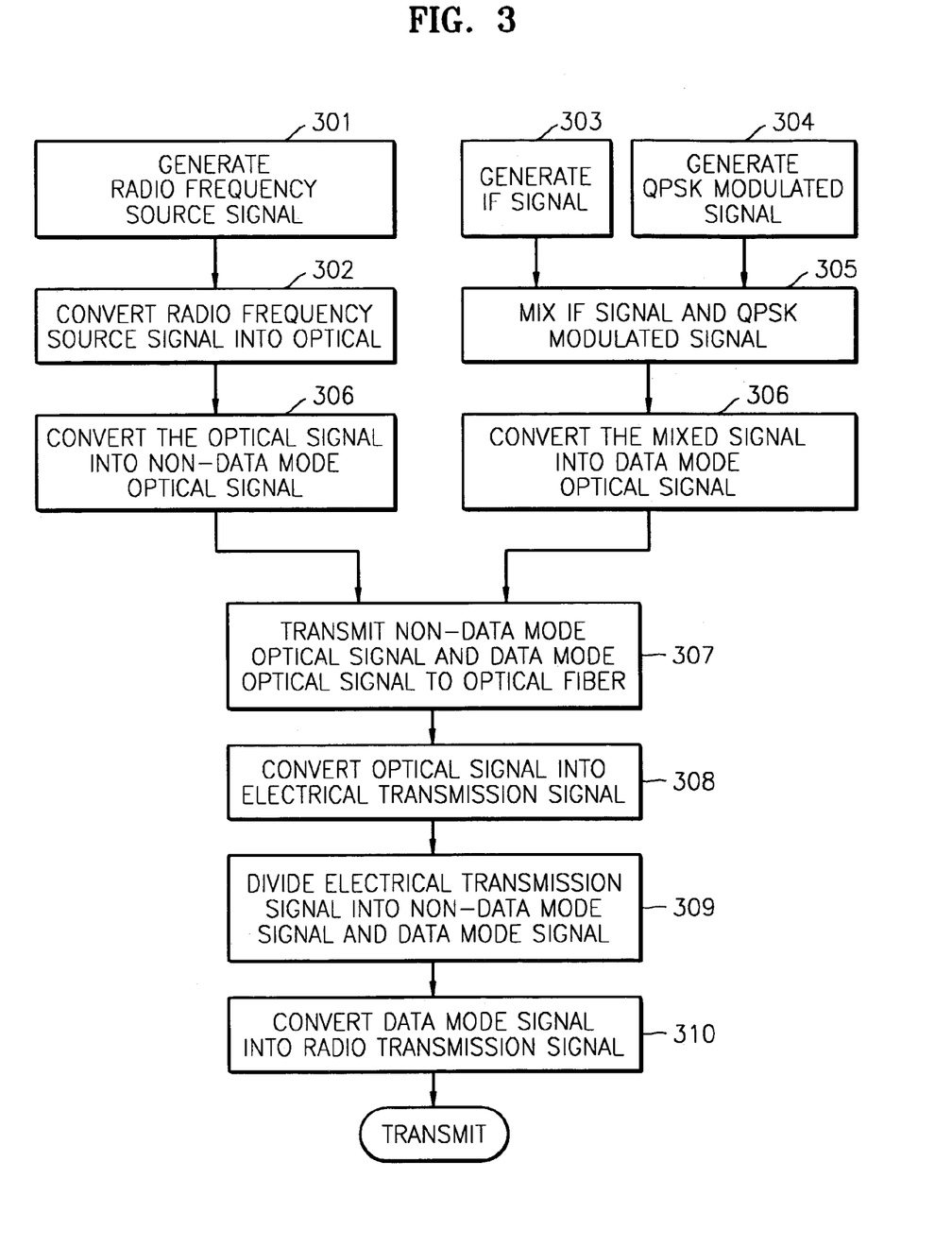
FIG. 3 is a flowchart of a transmitting method according to an embodiment of the present invention.
Figure 4:
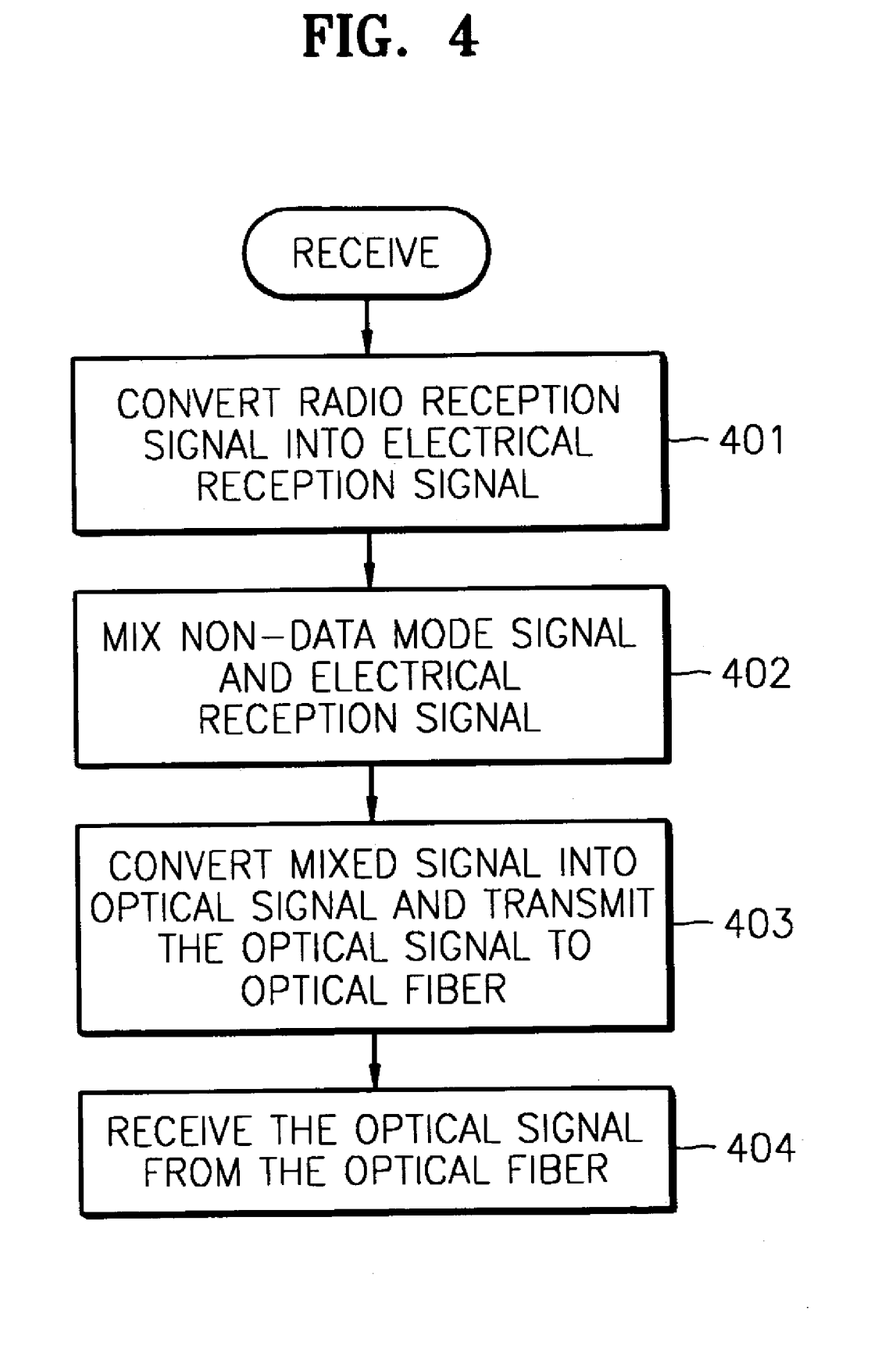
FIG. 4 is a flowchart of a receiving method according to an embodiment of the present invention.
Figure 5:
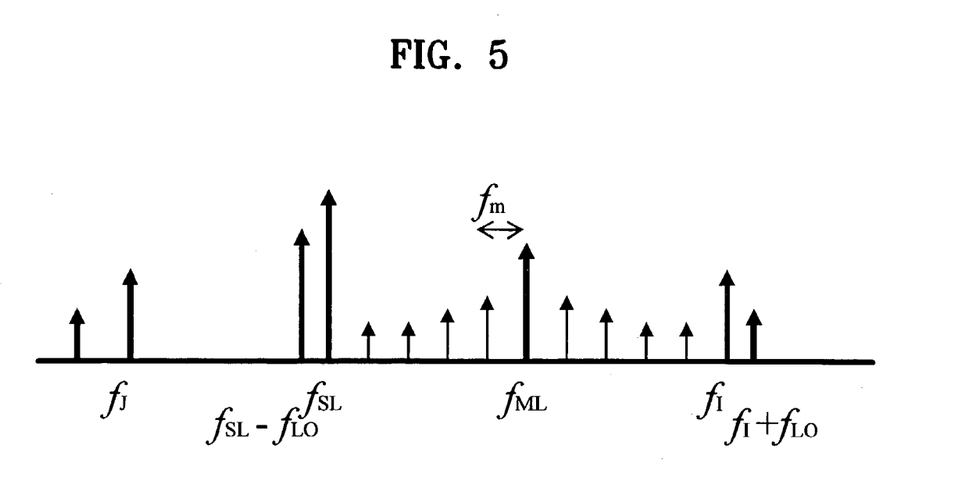
FIG. 5 shows the spectrum of optical signals according to the present invention.
Figure 6:
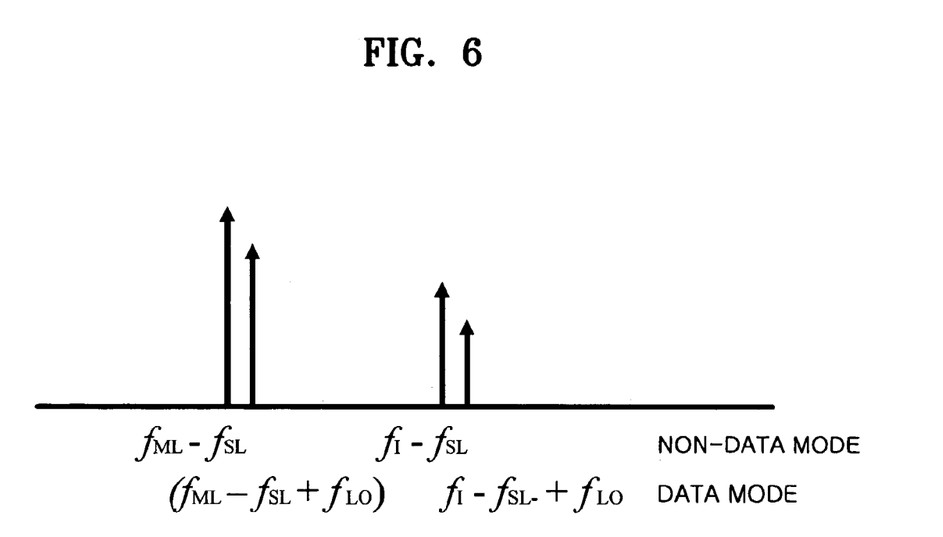
FIG. 6 shows the spectrum of RF signals according to the present invention.

FIG. 3 shows the spectrum of optical signals according to the present invention and FIG. 4 shows the spectrum of RF signals according to the present invention.

As described above, in a master laser to which a RF source fm is connected, frequency modulated side bands are formed at intervals of fm with a center frequency of the lasing frequency $f_{ML}$ of the master laser 12 as the result of frequency modulation. When outputs of the master laser are injected into a slave laser and a lasing frequency of the slave laser is within locking range of the modes of the inputs, a peak mode of the slave laser 16 is locked.

On the other hand, if the slave laser is modulated by a mixed signal of a data signal and an IF signal from a local oscillator, the output signal of the slave laser is down-converted at a frequency shifted by the frequency of the local oscillator $f_{LO}$ from a frequency $f_{SL}$ of the slave laser, i.e., $f_{SL}-f_{LO}$. When these signals are transmitted to a receiver, beat signals are detected in a photodetector. These beat signals are induced from different sources but have coherency due to mode locking of the slave laser 16 and the master laser 12 so that stability and purity of the beat signal are enhanced. The detected radio frequency signals include unmodulated mode signals of $f_{ML}-f_{SL}$ and modulated data mode signals of $f_{SL}-f_{LO}$. The data mode signal is sent to a radio (micro/mm) transmitter, converted into a wireless radio signal, and then distributed. The unmodulated mode signal is diplexed by a diplexer to substitute for a local oscillator.

In uplink communication, a signal received by an antenna is converted into an electrical signal. The electrical signal is down-converted by mixing with an unmodulated mode signal of $f_{ML}-f_{SL}$ and then modulates an uplink laser signal at a remote station. An optical signal is transmitted over an optical fiber and is received by a photodetector at a central office.

Another method to generate a high frequency signal such as micro/mm-wave is by beating between satellite modes such as FWM.

As described above, a high radio frequency can be generated by beating among basic modes. However, higher radio frequency can be generated using beating among the basic modes and a satellite mode such as FWM.

A continuous wave is generated by adjusting operating temperature or laser diode bias so that the lasing frequency of the master laser is sufficiently higher than the lasing frequency of the slave laser to achieve positive detuning ($f_{ML}>f_{SL}$). When the continuous wave is applied to the slave laser, almost pure FWM conjugate signals having frequencies of various combinations of $f_{ML}$ and $f_{SL}$ are generated due to non-linearity of a semiconductor laser. Here, since a photon density within the cavity of the slave laser vibrates at a frequency of about a difference in lasing frequency between the master laser and the slave laser, beat signals among the FWM conjugate signals are detected in a direct detector complying with a square law.

FIG. 7(a) shows a spectrum of the peaks of continuous waves each generated by the master laser 12 and the slave laser 16 and FWM conjugate modes appearing when the continuous waves interact with each other. The separation of the lasing frequencies of the master laser 12 and the slave laser 16 does not allow injection locking initially. $f_I$ and $f_J$ are FWM conjugate frequencies.

fb which is the interval between $f_I$ and $f_{ML}$ is the same as the interval between $f_J$ an $f_{SL}$ and the interval between the lasing frequencies of the master laser 12 and the slave laser 16. The frequency $f_{SL}$ of an optical signal generated by the slave laser 16 shifts to a lower frequency due to a reduction in the carrier density of the slave laser 16 when the laser light generated by the master laser 12 is injected into the cavity of the slave laser 16, the effect of which is called 'red shift'. Since the laser light injected into the slave laser 16 serves as a pump signal for FWM, not as a master laser for locking, the beat signals generated by the master laser 12 and the slave laser 16 have serious fluctuation and phase noise because of lack of coherency. In experiments, the fluctuation is in the order of tens of MHz for the beat signals of tens of GHz.

Figure 7:
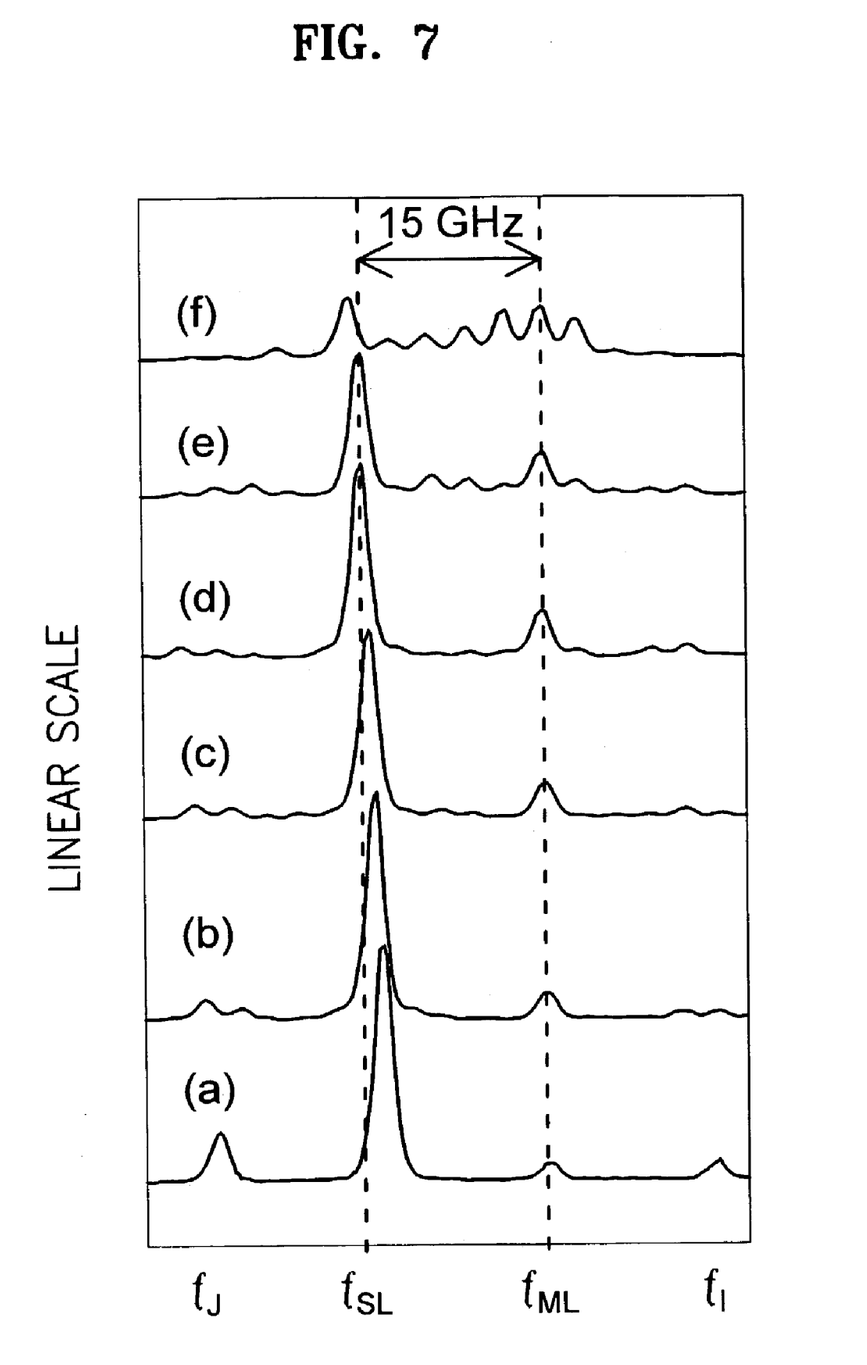
FIGS. 7(a)-7(f) show the spectrum of optical signals measured by a Fabry-Perot (F-P) interferometric analyzer for various modulating RF source powers according to the present invention.

FIGS. 7(*b*) and 7(*c*) are the spectrum of optical signals generated by the master laser 12 and the slave laser 16, respectively, when they are driven by the electrical signals at a RF band. In direct modulation of RF signals, frequency modulation as well as intensity modulation occurs only to cause sideband modes appearing around the lasing frequencies of the master laser 12 and the slave laser 16 at an interval of RF modulation frequency fm.

FIG. 7(*d*) shows the red shift that appears in the frequency $f_{SL}$ generated by the slave laser 16 due to injection locking. When the signals of the master laser 12 are injected to the slave laser 16, one of the sideband modes of the slave laser 16 is coupled with and locked to one of those of the master laser 12. Accordingly, $f_{SL}$ is shifted to $f_{SL}'$ which is located at a multiple of RF-modulation frequency fm from $f_{ML}$, and then the output signals from the slave laser 16 are locked. The injection locking is achieved when the sideband modes of the master laser 12, which is injected to the slave laser 16, are superposed within the locking range and coupled with some of the sidebands of the slave laser 16. With the injection locking of the side modes of $f_{ML}$, $f_{SL}$ is shifted to $f_{SL}'$ the difference between which and the master laser frequency $f_{ML}$ is a multiple of RF-modulation frequency fm. The more increased the power Pm of the RF-modulation signal is, the further red-shifted $f_{SL}$ and its side modes are, and the stronger coupling and locking of the slave laser with the master laser are.

As $f_{SL}$ is shifted to $f_{SL}'$, the FWM conjugate mode frequencies $f_i$ and $f_j$ are shifted to $f_i'$ and $f_j'$, respectively, and then locked with each other. Accordingly, the difference between the master/slave laser and its adjacent FWM conjugate mode is adjusted from $f_b$ to $f_b'$ that is a multiple of the RF-modulation frequency fm. All the FWM conjugate modes are locked with one another, and can generate stable beat signals with reduced phase noise.

Figure 8:
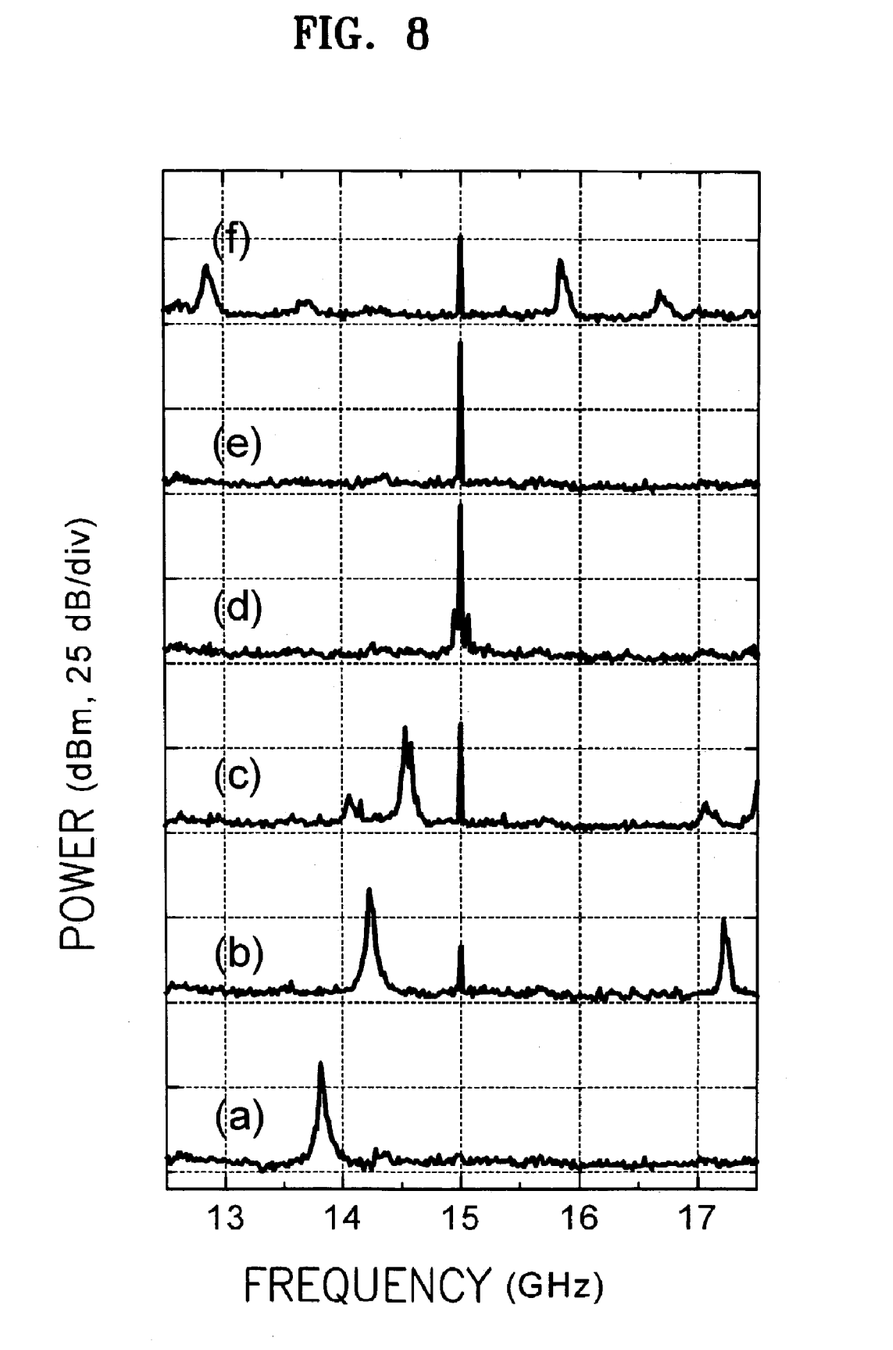
FIGS. 8(a)-8(f) show the spectrum of RF signals measured by a RF analyzer for various modulating RF source powers according to the present invention.
Figure 9:
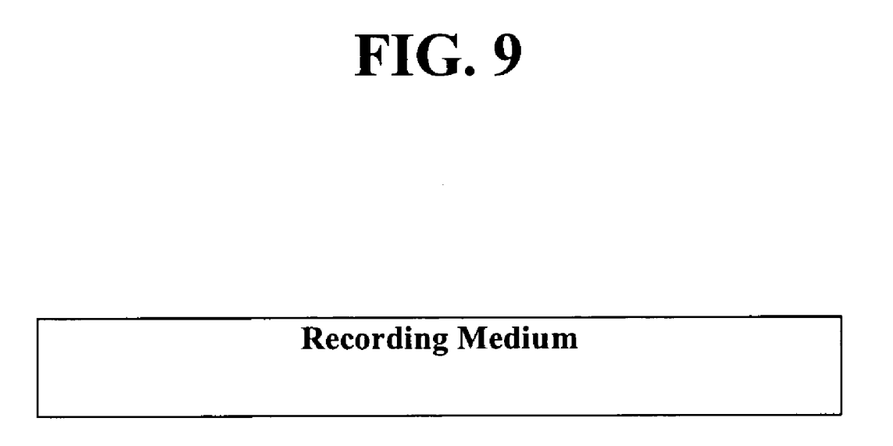
FIG. 9 illustrates a recording medium.

FIGS. 7(*a*)-7(*f*) and FIGS. 8(*a*)-(*f*) are spectrum of the outputs from the slave laser 16 which are measured with an optical spectrum analyzer (not shown), and an RF spectrum analyzer (not shown), respectively, when the laser light from the master laser 12 is injected into the slave laser 16 according to the present invention. In detail, FIG. 7(*a*) and FIG. 8(*a*) are the output spectrum from the slave laser 16 where no RF-modulated signal is supplied to the slave laser 16. FIG. 7(*b*) through (*f*) and FIG. 8(*b*) through (*f*) are the output spectrum from the slave laser 16 when the RF-modulated signals are supplied to the slave laser 16 with the power Pm of (b) 5 dBm, (c) 8 dBm, (d) 10 dBm, (e) 12 dBm and (f) 16 dBm, respectively.

As shown in FIG. 7(*a*) and FIG. 8(*a*), when the RF-modulating source is not connected to the slave laser 16, the outputs are the master/slave laser signals of frequencies $f_{SL}$, $f_{ML}$, their FWM conjugate mode signals, and the beat signals of a frequency of 13.8 GHz.

If the master and slave lasers are both directly modulated with the RF source of a frequency fm of 3 GHz, the frequency $f_{SL}$ is shifted to a lower frequency as shown in FIGS. 7(*b*) and 7(*c*). As the power Pm of the RF-modulating signal increases, $f_{SL}$ is further shifted to the lower frequency. This red shift of the lasing frequency of the slave laser 16 can also be shown in FIGS. 8(*b*) and 8(*c*), in that the frequency of the beat signal increases as the power Pm increases.

As seen in FIGS. 8, because of the electrical RF modulation, additional modes are generated and measured at the intervals fm from the main beat signal (of a frequency of a difference between the master and the slave laser frequencies) and a multiple of the modulated frequency, which are due to the higher order harmonics of the modulated signal. The additional mode shown in FIGS. 8(*b*), (*c*) and (*f*) is not superposed on the main beat signal mode, meaning that the main beat signal is not locked to the modulated signal and the other modes are just the higher order harmonics, that is, a multiple of fm.

Peripheral modes around the main beat signal are shown in FIGS. 8(*c*) and 8(*f*), due to the back reflection by the surface of the optical fiber pigtail of the slave laser 16 having no internal isolator.

As the power Pm is increased, the sideband modes of the slave laser 16 are red-shifted and locked to those of the master laser 12. Once locking is achieved, $f_{SL}$ is fixed at the spectral position 15 GHz (a multiple of fm) off from $f_{ML}$ as shown in FIGS. 7(*d*) and 7(*e*).

In FIGS. 8(*d*) and 8(*e*), the beat signal generated within the locking range has much less phase noise and no peripheral modes around it. In the case of Pm=12 dBm (FIG. 8(*e*)), the phase noise of the RF signal is −96 dBc/Hz at an offset frequency of 100 kHz from 15 GHz. In addition, while the line width of the unlocked signal in FIG. 8(*a*) is about 4 MHz, that of the locked signal is limited mainly by the resolution of the RF spectrum analyzer. Accordingly, it is noted that the present invention can also contribute to reducing line width of micro/millimeter-wave band signals.

As shown in FIGS. 8(*d*) and 8(*e*), the power of the beat signal increases remarkably, which means that the output signal results from locking. As long as the sideband modes of the slave laser 16 are locked, the frequency $f_{SL}$ is not further shifted with the increased Pm. In the experiment, the locking behavior in the slave laser 16 was maintained over a range of 10 dBm<Pm<13.5 dBm. But the locking condition was broken and the slave laser 16 got further red-shifted when the power Pm was greater than 13.5 dBm, as shown in FIG. 7(*f*) and FIG. 8(*f*).

In result, it is possible to generate stable micro/millimeter-wave band signals having less phase noise over a locking region of Pm of 10~13.5 dBm. Also, signals of 30, 45 and 60 GHz can be generated by beat signals between the FWM conjugates. Thus, a wide frequency range of generated signals can be achieved by the present invention.

According to the present invention, in optical micro/millimeter-wave transmission in a hybrid fiber-radio system, a satellite side mode, generated by two lasers and an IF local oscillator, is diplexed and is then used to up-convert frequencies of upstream signals, so efficient duplex communication can be accomplished. By using a diplexer instead of an expensive high-frequency local oscillator, a cost-effective system can be built. The present invention also stabilizes a light source, reduces signal deterioration by suppressing a non-linearity effect, and allows radio frequency conversion.

In addition to the above-described effects, the present invention provides a simple and efficient duplex transmission system which does not need a plurality of high-frequency sub IF oscillators in a remote base station, and increases flexibility of a broadband radio communication system such as a broad-wireless local loop (B-WLL) and so can be widely applied to broadband wireless systems. When beat signals between satellite modes such as FWM conjugate modes are used, the present invention can generate signals at a higher frequency like, such as a millimeter wave frequency. By the method according to the present invention, a locking range is as wide as 30 GHz by feeding a signal from a master laser 12 with a high power thereby allowing ease of control and tuning. The present invention contributes to the stabilization of a light source and so reduces phase noise and frequency fluctuation of the light source. The present invention also reduces third order inter modulation distortion (IMD) to increase a spurious-free dynamic range (SFDR), thereby accomplishing high-quality communication. Since a chirp of the light source is reduced, transmission dispersion decreases so that signal deterioration during transmission can be reduced. A load of an antenna at a remote base station can be reduced allowing many base stations or mobile devices in a pico-cell communication system to be simple and compact, thereby lowering costs of the system. Placement of controls and maintenance systems for a mobile communication system in one central station-allows channel allocation control, hand-over control and antenna position and maintenance to be easily carried out.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An apparatus for duplex communication in a hybrid fiber-radio system, the apparatus at a central office comprising:
    an electrical signal source unit for generating RF signals;
    a master laser driven by the RF signals from the source unit for generating optical signals;
    a local oscillator for generating intermediate frequency signals;
    a modulator for converting user source data into modulated signals;
    a mixer for mixing the intermediate frequency signals from the local oscillator and the modulated signals from the modulator to generate a mixed signal;
    a slave laser for outputting an unmodulated non-data optical signal at a lasing frequency and for generating a modulated data signal from the mixed signal at a down-converted frequency;
    an optical routing device for feeding optical signals from the master laser to the slave laser and for launching signals from the slave laser over an optical transmission fiber; and
    a photodetector for receiving an optical signal from the optical transmission fiber.

2. A downlink transmission method in a method for duplex communication in a hybrid fiber-radio system comprising:

(a) generating an optical signal with a master laser driven by an RF source;
    (b) generating an unmodulated non-data mode signal with low phase noise by injecting the optical signal into a slave laser, and using the optical signal to lock the lasing mode of the slave laser;
    (c) generating an intermediate frequency signal with a local oscillator;
    (d) converting user source data into a modulated signal;
    (e) mixing the intermediate frequency signal and the modulated signal to form a mixed signal;
    (f) feeding the mixed signal to the slave laser, which outputs a data mode signal at a lower side-band;
    (g) transmitting an unmodulated non-data mode signal and a data mode signal over an optical fiber with the routing operation of an optical routing device;
    (h) converting a received optical signal from the optical fiber into an electrical transmission signal;
    (i) splitting with a diplexer the electrical transmission signal into a data mode signal containing user source data and the unmodulated non-data mode signal;
    (j) converting the data mode signal into a radio signal; and
    (k) transmitting the radio signal wirelessly.

3. An article of manufacture having a machine-accessible medium including data that, when accessed by a machine, cause the machine to perform the method claimed in claim 2.

4. A communication system, comprising:
    a central station and remote stations, wherein the central station includes:
    a radio signal generator;
    a master laser driven by the radio signal generator to produce optical signals;
    an oscillator for generating intermediate frequency signals;
    a modulator for converting user data into modulated signals;
    a mixer for combining the intermediate frequency signals and the modulated signals to form a mixed signal;
    a slave laser for outputting an unmodulated non-data optical signal at a lasing frequency and for generating a modulated data signal from the mixed signal at a down-converted frequency;
    an optical routing device; and
    a photodetector.

5. The communication system as claimed in claim 4, wherein the radio signal generator drives the master laser using a direct modulation method.

6. The communication system as claimed in claim 4, wherein the optical routing device routes signals from the master laser to the slave laser and launches signals from the slave laser over an optical transmission fiber.

7. The communication system as claimed in claim 4, wherein the optical routing device injects the optical signals of the master laser into the slave laser to lock a lasing mode of the slave laser and generate an unmodulated optical beat signal.

* * * * *